(12) United States Patent
Alfrey et al.

(10) Patent No.: US 7,637,054 B2
(45) Date of Patent: Dec. 29, 2009

(54) COMPOSITIONS AND METHODS FOR ENHANCING PLANT GROWTH BY CHEMICAL OXYGENATION OF SOILS

(75) Inventors: Janice Alfrey, Costa Mesa, CA (US); Paul Alfrey, Costa Mesa, CA (US)

(73) Assignee: Bio Magic, Inc., Costa Mesa, CA (US)

( * ) Notice: Subject to any disclaimer, the term of this patent is extended or adjusted under 35 U.S.C. 154(b) by 0 days.

(21) Appl. No.: 11/972,546

(22) Filed: Jan. 10, 2008

(65) Prior Publication Data

US 2008/0092613 A1    Apr. 24, 2008

Related U.S. Application Data

(63) Continuation-in-part of application No. 11/781,863, filed on Jul. 23, 2007, now abandoned, which is a continuation-in-part of application No. 10/559,245, filed as application No. PCT/US03/17761 on Jun. 5, 2003.

(60) Provisional application No. 60/838,941, filed on Aug. 18, 2006.

(51) Int. Cl.
| | |
|---|---|
| C05C 1/00 | (2006.01) |
| C05C 3/00 | (2006.01) |
| C05C 5/00 | (2006.01) |
| C05C 9/00 | (2006.01) |
| C05C 13/00 | (2006.01) |
| B01D 12/00 | (2006.01) |
| B01F 17/00 | (2006.01) |
| B01F 17/02 | (2006.01) |
| B01F 17/18 | (2006.01) |

(52) U.S. Cl. .......................... 47/58.1 SC; 71/28; 71/29; 71/30; 71/58; 71/61; 71/63; 71/64.1; 516/198; 516/200; 516/204

(58) Field of Classification Search ....................... None
See application file for complete search history.

(56) References Cited

U.S. PATENT DOCUMENTS

| | | | | |
|---|---|---|---|---|
| 4,911,843 | A * | 3/1990 | Hunniford et al. | ............ 210/610 |
| 5,264,018 | A | 11/1993 | Koenigsberg et al. | |
| 6,206,946 | B1 * | 3/2001 | Hayashi et al. | ................ 71/31 |
| 6,329,324 | B1 | 12/2001 | Brueggemann et al. | |
| 6,458,179 | B1 | 10/2002 | Puskarich | |
| 6,826,866 | B2 * | 12/2004 | Moore et al. | ................ 47/48.5 |
| 7,192,523 | B2 | 3/2007 | Perriello | |
| 2005/0022570 | A1 * | 2/2005 | Duarte-MacDonald | ......... 71/33 |

\* cited by examiner

*Primary Examiner*—David T Fox
(74) *Attorney, Agent, or Firm*—Fish & Associates, PC

(57) ABSTRACT

Chemical combinations known to be used for odor control are provisioned for enhancing growth of a plant. The chemical combinations preferably include a stable, aqueous solution of a surfactant and a chemical source of oxygen. There are numerous ways by which one could learn that such combinations have utility in odor control. In preferred methods a manufacturer, distributor, retailer, farmer or other entity is informed of such through reading a journal article or other publication, or by a receiving a letter, fax, or email. The combinations can be used to reduce consumption of irrigation water and to increase a crop yield, each by at least 5-25%, as a consequence of applying the solution to a soil.

20 Claims, 2 Drawing Sheets

COMPOSITIONS AND METHODS FOR ENHANCING PLANT GROWTH BY CHEMICAL OXYGENATION OF SOILS

This application is a continuation-in-part of U.S. Ser. No. 11/781,863 filed Jul. 23, 2007, which was a continuation-in-part of U.S. Ser. No. 10/559,245 flied Apr. 26, 2006, which is a U.S. National Stage under 35 USC 371 of PCT/US03/17761, filed Jun. 5, 2003, and U.S. Ser. No. 11/781,863 also claims priority to provisional 60/838,941, filed Aug. 18, 2006.

FIELD OF THE INVENTION

The field of the invention is substances having a nutrient action on plant growth, especially plant protecting and regulating compositions.

BACKGROUND

Many soils suffer from poor hydraulic conductivity, i.e., reduced or inefficient movement of water, nutrients and oxygen through the soil. In agricultural crops the problem is usually addressed by turning the soil prior to each planting. In large grassy areas, such as golf courses and public parks where the soil cannot effectively be turned, the problem is often addressed by punching numerous small holes in the top of the soil. Unfortunately, these and all commercially practical mechanical methods only improve hydraulic conductivity at a macroscopic level. Moreover, repeated compaction, use of chemical fertilizers, and frequent irrigation tend to re-create or exacerbate the problem with uncomfortable rapidity. The problem even affects ordinary homeowners, who often notice that their lawns need more fertilizer and more water each year to achieve the same results.

There are chemical technologies for improving hydraulic conductivity through aeration of soils. For example, U.S. Pat. No. 3,912,490 to Boghosian (October 1975) teaches direct addition of urea peroxide or hydrogen peroxide to the soil, often with a heavy metal catalyst. Urea peroxide is considered especially advantageous because it is highly mobile, the urea increases the stability of $H_2O_2$, and urea peroxide is non-toxic at high concentrations. Frankenberger, W. T., *Factors Affecting the Fate of Urea Peroxide Added To Soil*", Bull Environ. Contam. Toxicol. (1997) 59:50-57. Calcium peroxide has also been used to increase oxygen levels, especially in clayey soils where it can significantly improve hydraulic conductivity. Note that these and all other referenced extrinsic materials are incorporated herein by reference in their entirety. Where term definitions are inconsistent between or among references, the broader or broadest definition applies.

Peroxides can also improve hydraulic conductivity by increasing total microbial populations and species diversity. U.S. Pat. No. 5,264,018 to Koenigsberg et al. (November 1993), for example, describes microbial decontamination of soil using high concentrations of metal peroxides (calcium, potassium, or magnesium), along with a surfactant (preferably 0.1 to 1% wt/wt of monolaurate, monopalmitate, monostearate, or monooleate ester or sorbitol, with or without ethoxylation) and an oxygen release modifier (preferably a source of simple phosphate ion). Interestingly, although the '018 patent appreciates the effect of peroxides on microbial populations, it fails to appreciate that such changes may be advantageous to growth of plants.

One drawback of using large quantities of peroxides is that they can sterilize the soil, thereby destroying substantially all of the "good" microbes. For example, U.S. Pat. No. 5,607,856 to Moon et al. (March 1997) teaches use hydrogen peroxide, peracetic acid, sodium peroxide, potassium peroxide, calcium peroxide, potassium oxide, and magnesium peroxide in sufficient quantities to sterilize soil for bioremediation. In such instances soil must be re-inoculated with beneficial bacteria and fungi for plants to grow effectively.

Non-peroxide sources have also been use to oxygenate soils. For example, U.S. Pat. No. 6,173,526 (January 2001) to Mazzei, teaches irrigating soils with oxygen infused water. While it is known that there are microbial sources of oxygen growing in a soil, extrinsic chemicals that can be manufactured and distributed in bulk, and that are neither ionic nor peroxides, have been largely or completely overlooked as materials for soil oxygenation. That is a considerable oversight since at least some fertilizer materials, including for example nitrates, are good oxygenators.

Fertilizers are sometimes combined with surfactants to enhance plant growth. For example, U.S. Pat. No. 6,206,946 to Hayashi et al. (March 2001) teaches a foliage spray containing a fertilizer, a surfactant, and a heptonic acid. U.S. Pat. No. 5,747,419 to Ishimoto et al. (May 1998) teaches a foliage spray using an iron cyanide fertilizer with a surfactant. US20040069032 to Krysiak et al., (April 2004) uses water soluble polyacrylamides (PAMs) in combination with a surfactant. Browning U.S. Pat. Nos. 5,391,542 (Feb. 1995) and 5,143,939 (September 1992), teach use of a specific surfactant such as UNION CARBIDE'S™ TERGITOL™ 15-S series of ethylene oxide derivatives to enhance plant growth, and to control nematode, worm, mite, and fungus. U.S. Pat. No. 6,460,290 to Moore (Oct. 2002) uses a fertilizer in combination a surfactant and alkyl polyglycoside. In U.S. Pat. No. 6,300,282 to Cooley (Oct. 2001), surfactants are applied to the soil after planting to maintain soil moisture levels near the potato root zone, and to prevent leaching of nutrients. Preferred surfactants are PREFERENCE™, a non-ionic surfactant blend containing soybean based fatty acid and alcohol ethoxylates; LI-319™, a non-ionic surfactant mixture of linear primary alcohol ethoxylates, ACTIVATOR N.F.™; a non-foaming, non-ionic wetting agent, surfactant, penetrant and spreader containing primary aliphatic oxyalkylated alcohol, dimethylpolysiloxane and adjuvant; WET-SOL 99™, a non-ionic surfactant containing poly(oxy-1,2 ethanediyl), alpha-(nonylphenyl)omega-hydroxy and a polysiloxane emulsion; ADVANTAGE FORMULA ONE™, a surfactant containing ammonium laureth sulfate, nonyl phenol ethoxylate; and ACTIVATOR 90™, a biodegradable, low-foaming, non-ionic surfactant and penetrant containing primary alkyl polyoxyethylene ether and free fatty acids and adjuvants. Again, none of these references teach, suggest or motivate one of ordinary skill in the art to provide a soil additive having a surfactant and a significant chemical source of oxygen.

The usual combination for promoting plant growth is a large quantity of fertilizer with a small to large quantity of surfactant. For example, U.S. Pat. No. 6,460,290 (October 2002) and U.S. Pat. No. 6,826,866 (December 2004) to Moore at al. describe aqueous compositions containing 65-99% fertilizer and 1-35% of a surfactant system. Similarly, U.S. 2004/0031305 to Kober et al., (publ. February, 2004) teaches a combination of 5-40% ammonium nitrate with 0.1-5% surfactant.

It is also known that a solution containing a small to large quantity of an oxygenator can be combined with small quantities of surfactants to reduce odors in air, sewage systems, on trash heaps and so forth. See WO04108173 to Alfrey et al., (December 1004). Such solutions apparently work by shifting microbial populations from anaerobic to aerobic metabolism, thereby reducing noxious smells that would otherwise derive from the anaerobic metabolism.

What appears to have been completely unappreciated is that the same solutions that are effective to treat odors can also be applied to soils or other plant growth media to promote plant growth. Thus, the Moore patents described above suggest nitrate as a fertilizer, but have no mention whatsoever of nitrate as an oxygenator, let alone contemplate using combinations containing nitrate as odor reducers. Still further, it has been completely unappreciated that odor treating compositions having low fertilizer and low surfactant concentrations can be extremely effective in promoting plant growth.

SUMMARY OF THE INVENTION

Compositions, systems, and methods are provided in which chemical combinations known to be used for odor control are provisioned for enhancing growth of a plant, and reducing consumption of water and/or fertilizer. The chemical combinations preferably include a stable, aqueous solution of a surfactant and a chemical source of oxygen. The chemical source of oxygen more preferably excludes peroxide or superoxide.

There are numerous ways by which one could learn that such combinations have utility in odor control. In preferred methods a manufacturer, distributor, retailer, farmer or other entity is informed of such through reading a journal article or other publication, or by receiving a letter, fax, email or other point to point communication.

All manner of surfactants are contemplated, including ionic and non-ionic, and polymeric and non-polymeric surfactants. Preferred surfactants include nonylphenyl and ethoxylated compounds, dodecyl betaine, dodecyl dimethylamine oxide, cocamidopropyl betaine, coco ampho glycinate, sodium dodecyl sulfate (SDS), sodium laureth sulfate, and alkyl benzene sulfonate, an alkyltrimethylammonium salt, cetyl pyridinium chloride, polyethoxylated tallow amine (POEA), and benzalkonium chloride. The surfactant(s) is/are preferably present in the solution at a total concentration of less than 20 wt %, and more preferably less than 5 wt %, 2 wt %, and even 1%. Most preferably the total concentration of surfactant(s) is no more than 0.1%.

All suitable chemical sources of oxygen are contemplated, including those that contain nitrogen, sulfur, and phosphorous. Nitrate and other non-peroxides are especially preferred sources. The chemical source(s) of oxygen is/are preferably present in the solution at a total concentration of less than 50 wt % and more preferably less than 20 wt %, 10 wt %, and even 5%. Water is preferably present in the solution at a concentration of at lease 80 wt %, and more preferably at least 90% or even 95%.

Provisioning of a solution can occur in any suitable manner, including recommending, manufacturing, distributing, marketing, using the solution on a lawn, golf course, farmland or anywhere else a plant is grown. Of particular interest is provisioning a solution by marketing or using a solution under the trade name BIOMAGIC.™ However, it is contemplated that provisioning a solution by marketing or using a solution can also be used, marketed, sold, researched and used under any other names, such as generic or brand names. Provisioning also includes combining a solution of the present invention with at least one of humic acid, compost extract, compost tea, and/or adding one or more micronutrients.

Still further contemplated methods include using the contemplated solutions to reduce consumption of irrigation water by at least 5%, at least 15%, or at least 25% as a consequence of applying the solution to a soil. Similarly, contemplated methods include using the contemplated solutions to increase a crop yield by at least 5%, at least 15%, or at least 25% as a consequence of applying the solution to a soil.

In what is probably the most surprising result, application of test solutions to soils reduce nitrogen, phosphorous, and potassium (NPK) type fertilizer requirements by between 5 and 25%, depending on plant type, soil type, growing conditions, and other factors not yet elucidated. These or other plant nutrients can be provided within the solution itself, or can be added before or after application of the solution.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
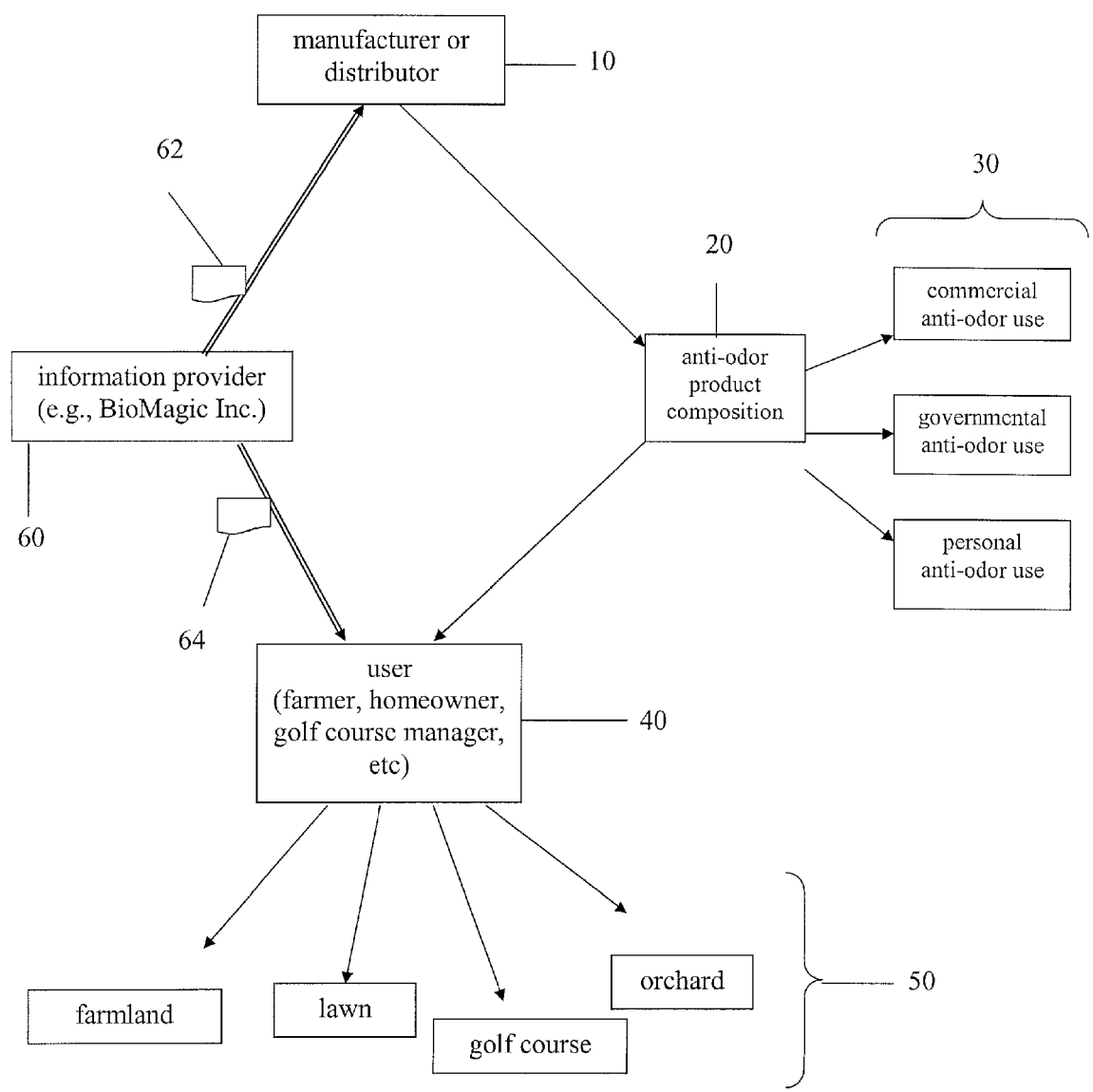
FIG. 1 is a schematic showing diversion of an anti-odor product from an anti-odor usage to usage as a plant growth enhancer, and receiving advice related to same from a competitor.

In FIG. 1, a manufacturer or distributor 10 provides an anti-odor composition 20 to the marketplace 30. A diverter 40 obtains a quantity of the composition, and applies it as a plant growth enhancer to farmland, lawn, golf course, orchard or other plant growing area 50. A competitor or other information provider 60 finds out about the diverter's activities, and sends a letter or other communication 62, 64 to the manufacturer or distributor 10, or the diverter 40, respectively.

The anti-odor composition 20 is preferably a combination of: (a) a fertilizer or other source of nitrogen; (b) a chemical source of oxygen; (c) a surfactant; and optionally (d) one or more micronutrients; (e) pH adjuster; and (f) a colorant. It is also contemplated that while the anti-odor compositions can be effective by adding it to a known fertilizer, the addition of fertilizer is not necessary to accomplish the same results. While not wishing to be bound to any particular theory or mechanism of action, it is currently contemplated that anti-odor compositions can operate by encouraging growth of aerobic bacteria relative to anaerobic bacteria, and by encouraging facultative bacteria to switch to an aerobic mode in which they produce less odorous waste and decompose biomass. Particularly, the anti-odor compositions stimulate the aerobic bacteria that live in close proximity to the plant roots to disperse beneficial materials and compounds in the soil. This dispersion of beneficial materials and compounds are provided to the immediate area of the roots that otherwise may not be available to the plant. Of particular interest are the enteric group bacteria comprising the enterobacteracae family, denitrifying bacteria, and other types of facultative bacteria. Some contemplated aerobic bacteria include nitrifying bacteria, sulfur oxidizing bacteria, methane oxidizing bacteria, pseudomonas, etc. Such compositions can be especially effective in accelerating decomposition of organic matter in sewage, sludge or other biomass.

Nitrogen Source(s)

Many sources of nitrogen may be used, as long as the nitrogen is bioavailable. It is known, for example, that bacteria can metabolize nitrates, nitrites, amino acids, urea, uric acid, and creatinine. In preferred embodiments, the source of nitrogen is either nitrates or urea because those sources are relatively inexpensive, and are especially nutritious for bacteria. In terms of nitrates, all common and structurally stable nitrates may be used as long as they provide an available nitrogen source to facultative and/or aerobic bacteria. Some common examples of nitrates include $HNO_3$, $NaNO_3$, $LiNO_3$, $KNO_3$, $RbNO_3$, $FrNO_3$, $Be(NO_3)_2$, $Mg(NO_3)_2$, $Ca(NO_3)_2$, $Sr(NO_3)_2$, $Ba(NO_3)_2$, $Ra(NO_3)_2$, $NH_4NO_3$, and even $Ag(NO_3)_2$. Preferred nitrates include potassium nitrate, calcium nitrate, and ammonium nitrate because they provide further nutrition for facultative and/or aerobic bacteria.

Odor control compositions of the present invention may comprise only one nitrogen source, including for example, potassium nitrate, ammonium nitrate, or creatinine. However, it is also contemplated that a combination of various nitrogen sources may be advantageous, as different sources may be preferentially utilized by different bacteria. In most preferred embodiments, the odor control composition comprises calcium nitrate, ammonium nitrate, potassium nitrate, and urea.

U.S. Pat. No. 4,911,843 to Hunniford et al. (May 1990), reissued as RE36651 (April 2000) and RE37181 (May 2001), teaches that that the addition of nitrate, via an aqueous sodium nitrate solution, to sewage systems, waste treatment plants and other industrial waste applications containing dissolved hydrogen sulfide, can be effective in eliminating or substantially reducing the hydrogen sulfide, as well as eliminating other "minor" odors associated with other sulfur-containing compounds. Contrary to the teachings of the Hunniford et al. patents, the current inventors have found experimentally that the percentage of nitrogen in the composition is not especially critical. Compositions having at least 5% of the aqueous solution can be reasonably effective, and compositions having between 10 and 70 percent nitrogen to be even more effective. The amounts of nitrogen sources that are used depend on various factors including types of bacteria involved, temperature, types of odors, strength of the odor, amounts of bacteria present, type and composition of the environment (i.e. volume of water, sewage, air, etc.) to be treated, as well as various other factors that may also come into play. Preferred embodiment is to have compositions having between 2 and 50 percent nitrogen. When urea is used, bacteria has found to grow well in compositions having approximately 2-40% urea, and more preferably between 15-30% urea. In terms of dry weight percents, optimal formulations including at least 2% of at least one of ammonium nitrate and calcium nitrate, at least 2% of urea, and at least 0.01% of potassium nitrate.

In preferred embodiments, it is advantageous to have a total amount of ammonium nitrate, calcium nitrate, and potassium nitrate that is present in an amount between 5-50 wt %. It is especially preferred that the composition comprise a total of 54 wt % of ammonium nitrate, calcium nitrate, and potassium nitrate. One class of especially preferred formulations includes 1-20 wt % calcium nitrate, especially 15 wt %, 2-40 wt % ammonium nitrate, especially 39 wt %, 0.01-12 wt % potassium nitrate, especially 0.1 wt %, and 2-30 wt % urea, especially 20 wt %. In another class of preferred formulations, the composition comprises 30-60 wt % ammonium nitrate, 10-30 wt % calcium nitrate, 1-10 wt % sodium nitrate, 5-10 wt % uric acid, and 1-10 wt % glycine. Another class of preferred formulations includes 10-40 wt % potassium nitrate and 2-20 wt % urea.

Oxygen Source(s)

Preferred oxygen sources are those having loosely associated oxygen, defined herein to mean oxygen other than $O_2$ that facultative and aerobic bacteria can readily metabolize. Loosely associated oxygen can be covalently or ionically bound, and typically includes at least one hydrogen bond. Preferred sources of loosely associated oxygen are nitrates, sulfates, sulfites, phosphates, phosphates, and urea. Specific examples include $H_2SO_4$, $Na_2SO_4$, $Li_2SO_4$, $K_2SO_4$, $Rb_2SO_4$, $Cs_2SO_4$, $Fr_2SO_4$, $BeSO_4$, $MgSO_4$, $CaSO_4$, $SrSO_4$, $BaSO_4$, $RaSO_4$, $H_2PO_4$, $Na_2PO_4$, $Li_2PO_4$, $K_2PO_4$, $Rb_2PO_4$, $Cs_2PO_4$, $Fr_2PO_4$, $BePO_4$, $MgPO_4$, $CaPO_4$, $SrPO_4$, $BaPO_4$, $RaPO_4$. Other contemplated oxygen sources include carbohydrates, sugars, etc. In addition to providing bacteria with oxygen, carbohydrates and sugars also provide bacteria with energy.

The oxygen source(s) can be the same as the nitrogen source(s) discussed above, and such formulations are preferred. For example, in most preferred embodiments, the oxygen source is loosely associated oxygen that is derived from a nitrate, urea, or combination of both. The oxygen can be present in any amount as long as it is not lethal to the bacterial population. Oxygen sources are especially preferred because they are relatively stable and are readily available for use or consumption by bacteria and may promote a hyper-growth state in such bacteria.

Surfactant(s)

While not wanting to be limited to any particular theory in this or any other aspect of the application, it is contemplated that a surfactant helps the bacteria feed on the nitrogen and oxygen sources and assists in the mixing of the nitrogen and oxygen source(s).

Practically any surfactant can be utilized, as used as long as it is mild and does not tend to disrupt the cellular membrane of microorganisms. Suitable surfactants include those commonly found in soaps, shampoos, detergents, as well as wetting agents. Although both ionic and non-ionic surfactants are contemplated, non-ionic surfactants are preferred because they tend not to alter the pH of the composition.

In preferred embodiments, nonyl-phenyl-ethoxylated surfactants is used with 0.001-5 wt %, as opposed to other preferred embodiments where only 0.02 wt % surfactant is used. Thus, it is contemplated that a large volume of surfactant is not necessary and that more than one type of surfactant may be used to improve the effectiveness of the composition.

Mixing

In preferred embodiments, an odor control composition is created by mixing a combination of a source of nitrogen, a chemical source of oxygen, and a surfactant in an aqueous solution. The combination is produced for the purpose of producing an odor control composition in the manner claimed.

Preferred odor control compositions and methods include water or other aqueous fluid in addition to the nitrogen source (s), oxygen source(s), and surfactant(s). The various ingredients should be thoroughly mixed, preferably via an automatic mixer but may also be accomplished manually, depending on the amount of composition being made. After mixing, the composition is typically pH adjusted to a neutral pH, using standard acid, such as nitric acid and hydrochloric acid (i.e. 6M $HNO_3$ or 20M HCl) and base, such as ammonium hydroxide and sodium hydroxide (i.e. 6M $NH_4OH$ or 16M NaOH). A non-aqueous fluid may be added to the composition, but such compositions are generally not preferred because they are often harder to work with.

Although various concentrations of the composition have been described herein, it may be advantageous to further dilute or concentrate the composition for use. For example, perhaps a concentrated solution is preferable for sale to keep shipping costs down and to minimize shelf space. Alternatively, perhaps a diluted composition may be preferable for sale so as to reduce any possible hazards in storage, handling, and transport of the composition.

Furthermore, the concentration of the composition may vary depending on several factors, including the amount of odor that needs to be controlled; the use of the composition; the strength and/or effectiveness of the composition; environmental conditions including temperature, humidity, etc.; amount of nitrogen and oxygen source(s) in the composition; the type and amounts and types of bacteria present in a biomass if applicable; and various other factors. Exemplary dilutions include 1:50, 1:100, and even 1:500 depending on various factors. In a preferred embodiment, a concentrated composition is sold, and the end user may dilute the product to 1:10, 1:100, 1:500, 1:10,000, or even 1:40,000, depending on the desired effectiveness of the composition. It is presently thought that in the treatment of airborne odors, the product would not be diluted to more than 1:700.

Marketing and Usage

The preferred method of marketing for anti-odor usage is to package the composition with a labeling identifying the composition as having efficacy in controlling odors, and offering the same for sale to businesses, households, governments, water districts, and so on. All manner of suitable packaging is contemplated including spray or non-spray bottles for individual use, as well as drum or other bulk packaging. Even small, personal size spray bottles are contemplated that can be readily carried on one's person or in one's luggage to treat odors in carpet or bedding of hotel rooms, and in bathrooms and other places subject to multiple person usage. The odor control compositions can be sold for various purposes, including deodorizing a room, area, or industry, and even for use as a plant growth stimulant.

Diversion

Although it was contemplated in the parent utility and grandparent WIPO applications that odor controlling compositions might be useful for stimulating or otherwise enhancing plant growth, it has now been confirmed that such is the case. It is therefore now contemplated that compositions suitable for anti-odor uses could manufactured and distributed for use in, or be otherwise be diverted to, enhancing plant growth. It is further contemplated that methods of securing revenue to the inventors from such provisioning would be by advising others of the potential dual use.

Figure 2:
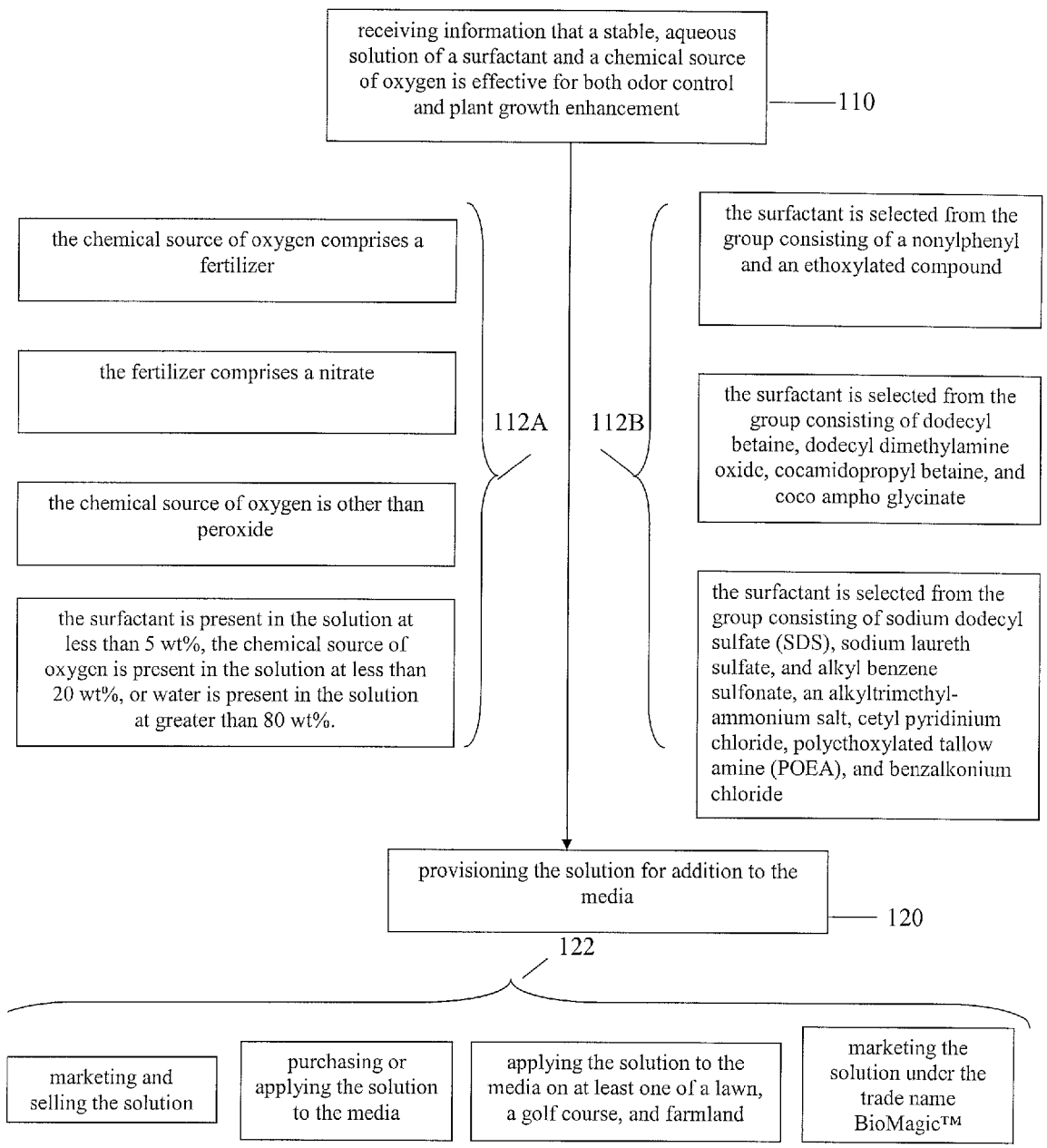
FIG. 2 is a schematic of method according to various aspects of the present invention.

In FIG. 2, a method has a first step 110 of "receiving information that a stable, aqueous solution of a surfactant and a chemical source of oxygen is effective for both odor control and plant growth enhancement", and a second step 120 of "provisioning the solution for addition to the media". Optional additional steps and aspects of step 110 are shown as 112A and 112B. Optional additional steps and aspects of step 120 are shown as show as 122.

EXAMPLES

The following examples illustrate particularly embodiments of the present inventive subject matter, and aid those of skill in the art in understanding and practicing the inventive subject matter. They are set forth for explanatory purposes only, and are not to be taken as limiting the present inventive subject matter in any manner.

Example 1

Thatching Treatment

The odor control material commercially sold as BIOMAGIC™ from BIOMAGIC,™ Inc., in Costa Mesa, Calif., has been applied experimentally to various plants to determine whether there are any effects on growth of those plants. The surprising results are that BIOMAGIC™ is extremely effective in causing the soil particles to hold water in a more sustained manner, and in considerably increasing the growth of the plants.

Thatch is described as a tightly intermingled layer of partially decomposed stems, roots, and some leaves of grasses which develops beneath the actively growing green vegetation at the soil surface. Thatch accumulates when the rate of decomposition is much lower than the rate of grass growth. Use of certain fertilizers or pesticides may encourage an accumulation of thatch by increasing turf growth and/or killing beneficial organisms, such as earthworms. Excessive mowing can also contribute thatch accumulation and it often happens on golf courses. Overgrown thatch reduces penetration of water and other materials, such as fertilizer. It also encourages shallow grass roots which makes turf more susceptible to stress and pests. A heavy build up of thatch can require expensive dethatching.

Soil that has been treated with the anti-odor composition exhibits much more porous and appears to be in aerobic condition. The thatch condition almost completely disappeared. The anti-odor composition opened up the soil and eliminated the compacting that leads to the creation of the thatch layer. Soil that has not been treated with the anti-odor composition but with standard thatching treatment protocol is still left compacted. Hardly any root structure is shown in the thatch and there is still a line delineating the "thatch" layer. Scrapping of this thatch layer would be time consuming and expensive.

Still another surprising result was that use of the contemplated solutions was effective to facilitate settling of particulates in a settling pond. It is also contemplated that application of a stable, aqueous solution of a surfactant and a chemical source of oxygen can reduce NPK type fertilizer requirements by at least 5% for a given crop and growing conditions, more preferably by at least 10%, still more preferably by at least 20% and most preferably by at least 25%.

Thus, specific embodiments and applications have been disclosed for provisioning plant growth enhancers from among compositions that are known to also reduce odors. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of enhancing growth of a plant in a media, said method comprising:
   (a) receiving information that a stable, aqueous solution comprising a surfactant and a nitrate is effective for both odor control of the media and plant growth enhancement;
   (b) producing an odor control solution by mixing a surfactant and a source of nitrogen in an aqueous solution, wherein the nitrogen comprises between 2 and 50% wt of the solution and the surfactant comprises at most 0.02% wt of the solution, and wherein the source of nitrogen is a nitrate;
(c) provisioning the odor control solution for addition to the media;
(d) advising an end user to dilute the odor control solution by at least 100; and
(e) advising the end user that the diluted solution is effective for both odor control of the media and plant growth enhancement.

2. The method of claim 1, wherein the surfactant is selected from the group consisting of a nonylphenyl and an ethoxylated compound.

3. The method of claim 1, wherein the surfactant is selected from the group consisting of dodecyl betaine, dodecyl dimethylamine oxide, cocamidopropyl betaine, and coco ampho glycinate.

4. The method of claim 1, wherein the surfactant is selected from the group consisting of sodium dodecyl sulfate (SDS), sodium laureth sulfate, an alkyl benzene sulfonate, an alkyltrimethylammonium salt, cetyl pyridinium chloride, polyethoxylated tallow amine (POEA), and benzalkonium chloride.

5. The method of claim 1, wherein water is present in the odor control solution at greater than 80 wt %.

6. The method of claim 1, wherein the step of receiving information comprises receiving a letter from a competitor.

7. The method of claim 1, wherein the step of provisioning comprises at least one of marketing and selling the odor control solution.

8. The method of claim 1, wherein the step of provisioning comprises at least one of purchasing the odor control solution, diluting the odor control solution, and applying the diluted solution to the media.

9. The method of claim 7, wherein the step of provisioning comprises marketing the odor control solution under the trade name BIOMAGIC™.

10. The method of claim 8, further comprising applying at least one of humic acid, compost extract, and compost tea to the media.

11. The method of claim 8, further comprising reducing consumption of irrigation water for a crop by at least 5% as a consequence of applying the diluted solution to the media.

12. The method of claim 8, further comprising increasing a crop yield by at least 5% as a consequence of applying the diluted solution to the media.

13. The method of claim 8, further comprising reducing consumption of fertilizer for a crop by at least 5% as a consequence of applying the diluted solution to the media.

14. The method of claim 1, comprising advising the end user to dilute the odor control solution by at least 500.

15. The method of claim 1, wherein the odor control solution further comprises at least one of sulfur and phosphorus.

16. The method of claim 1, wherein the source of the nitrate comprises a fertilizer.

17. The method of claim 1, wherein the odor control solution further comprises at least one plant nutrient in addition to any nutrient provided by the surfactant and the nitrate.

18. The method of claim 1, wherein the nitrate comprises at least one of calcium nitrate, ammonium nitrate and potassium nitrate.

19. The method of claim 1, wherein the odor control solution further comprises urea.

20. The method of claim 19, wherein the odor control solution comprises 15 wt % calcium nitrate, 39 wt % ammonium nitrate, 0.1 wt % potassium nitrate, and 20 wt % urea.

\* \* \* \* \*